United States Patent

[11] 3,603,811

[72] Inventors Christopher C. Day;
Bo Holte, both of Newtonville, Mass.
[21] Appl. No. 883,412
[22] Filed Dec. 9, 1969
[45] Patented Sept. 7, 1971
[73] Assignee American Optical Corporation
Southbridge, Mass.

[54] TWO-TERMINAL BIPOLAR SELF-POWERED LOW CURRENT LIMITER
8 Claims, 16 Drawing Figs.

[52] U.S. Cl. .......... 307/237, 128/2.1 R, 307/202, 307/251, 307/304, 323/9
[51] Int. Cl. .......... H03k 5/08
[50] Field of Search .......... 307/237, 251, 304, 279, 235, 205, 202; 328/169; 323/9; 128/2.06 B, 2.06 R, 2.1 R

[56] References Cited
UNITED STATES PATENTS
3,369,129 2/1968 Wolterman .......... 307/237
3,521,087 7/1970 Lombardi .......... 307/251 X
OTHER REFERENCES
Amelco Semiconductor, Field Effect Transistors, Theory & Application Notes No. 2, June 1962, pp. 6 & 7 relied on. 307/304

*Primary Examiner*—Stanley T. Krawczewicz
*Attorney*—Amster & Rothstein

ABSTRACT: A two-terminal, bipolar, self-powered low current limiter having particularly advantageous use for limiting currents in body electrodes connected to biomedical electronic equipment to the microampere range. In one embodiment of the invention, a pair of series connected field effect transistors form a bipolar current limiting device. In another embodiment of the invention, four field-effect transistors are provided in the form of two series connected bistable devices. In both cases, an additional pair of field-effect transistors can be used to increase the breakdown voltage in both directions.

INVENTORS
CHRISTOPHER C. DAY
BO HOLTE
BY Amster & Rothstein
ATTORNEYS

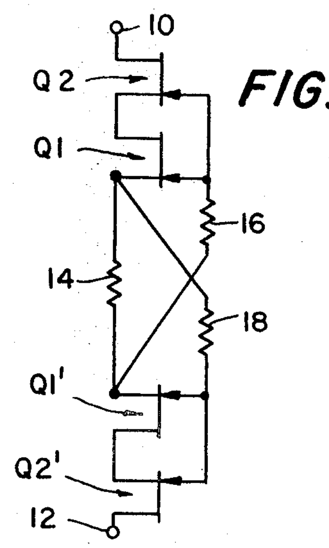
FIG. 4A
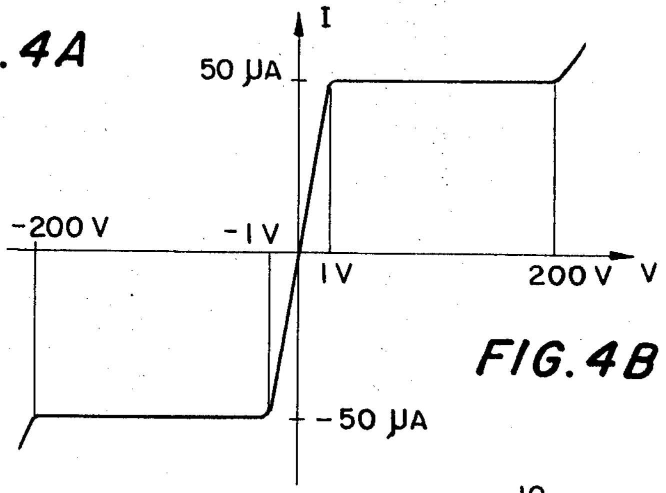
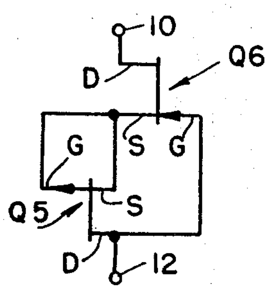
FIG. 5
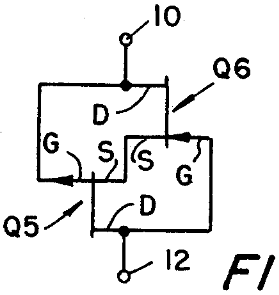
FIG. 6
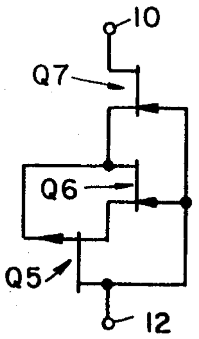
FIG. 7
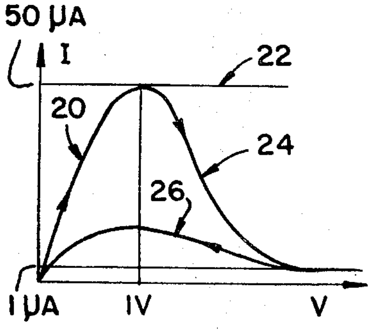
FIG. 8
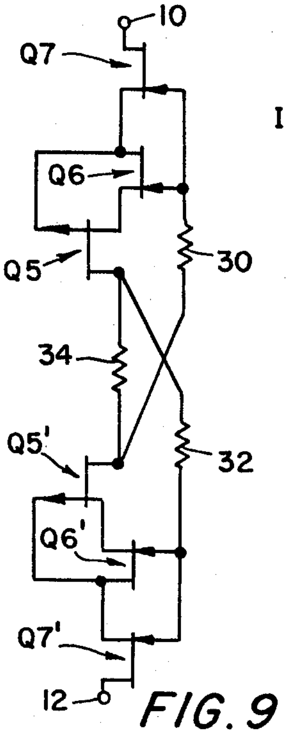
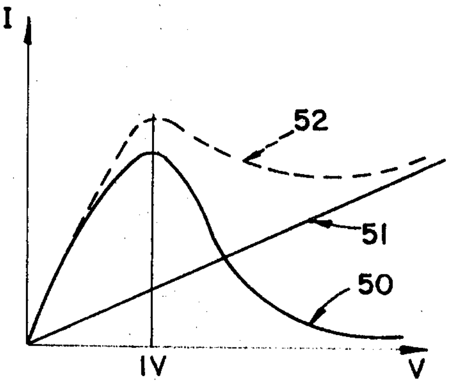
FIG. 10
INVENTORS
CHRISTOPHER C. DAY
BY BO HOLTE
Amster & Rothstein
ATTORNEYS

TWO-TERMINAL BIPOLAR SELF-POWERED LOW CURRENT LIMITER

This invention relates to two-terminal, bipolar, self-powered low current limiting circuits, and more particularly to such circuits which are highly advantageous when used in the electrode leads of biomedical electronic equipments.

In recent years, a variety of biomedical electronic equipment has been developed, many of these instruments serving to monitor various physiological conditions of a hospitalized patient. It is very common to find a multiplicity of such instruments connected to an individual patient in a hospital. For the most part, the instruments are used for monitoring purposes, although there are instances in which electrical signals are applied to the patient for purposes other than monitoring. In most cases it is necessary to insure that an excessive current does not flow through the patient, that is, through the connected electrodes and leads. A variety of standards have been proposed, but 100 microamperes through any external connection is considered a safe maximum value. In the case of internal leads, such as catheters into the heart, a maximum safe upper limit of 10 microamperes has been suggested. If either of these limits is exceeded, the patient being monitored may have undesirable current levels passing through his body.

There is much concern about the possibility that many patients are indeed being electrocuted accidentally at the present time. The problem is not limited to faulty equipment designs, although this aspect of the problem has not been completely solved. The most severe problem has not been completely solved. The most severe problem arises from the interconnection of many different instruments. For example, the leads from an electrocardiographic machine as well as an electroencephlographic machine may both be connected to the patient, with both machines having their ground leads connected together at some point on the patient's body. Such common connections are also often found when a nurse's central station is provided for monitoring several different patient's functions at the same time. Each individual machine may be designed to prevent excessive currents. However, if one machine malfunctions it can cause another machine to draw an excessive current. For example, if the ground lead to one of two instruments is broken, the ground current for both machines will be returned over the ground conductor to the other instrument.

There has therefore arisen a very great need to limit the current drawn through a patient's body as a result of the operation of any instrument, either alone or in conjunction with others. Many instruments are provided with specially designed isolation transformers for this purpose, but such transformers are both expensive and have not proven to be a complete solution to the problem.

It is an object of our invention to provide a low current limiting circuit in series with a lead of a biomedical electronic instrument; by providing such a current limiting circuit in series with each lead it is impossible for any lead to draw current in excess of the maximum safe value.

The simplest approach to the design of such a current limiter is to consider the maximum potential which may appear at any electrode attached to the patient's body and to use a large enough resistor in series with the lead. For example, suppose that the maximum voltage is 200 volts (such high peak voltages can arise if the patient accidentally touches a "live" wire). A 2 -megohm resistor could then be placed in series with each lead to the instrument to limit the current to 100 microamperes. However, such a large resistor cannot be used in practice because it would severely degrade the instrument performance as is known to those skilled in the art. For this reason, if current limiting is to be provided for any lead, it is neccessary that the circuit offer relatively little resistance to small currents and a very high resistance to larger currents. Active powered circuits are available for this purpose; however, active circuits generally require connections to at least three terminals as well as a source of power.

It is a more specific object of our invention to provide a two-terminal, bipolar, self-powered current limiting circuit, that is, a two-terminal device which may be placed in series with the lead to a patient and which will offer relatively little resistance to low currents and a very high resistance to larger currents (for example, in excess of 100 microamperes).

It is necessary that any current limiting device of this type be able to pass a safe current in each of two directions since a typical monitored signal can be of either polarity. In addition to being bipolar, the current limiting circuit must also be capable of withstanding excessive voltages of either polarity. (A fuse-type current limiter is of little value; once a fuse blows, no more current flows through it. While the patient might be protected, there would be no monitoring following the blowing of the fuse. The problem is particularly severe when the large current which blows the fuse arises from a high voltage deliberately applied to the patient, e.g., from a defibrillator, and when immediately after the application of the high voltage it is necessary to verify that some physiological change has taken place. If the fuse blows with the application of the high voltage, verification is not possible.)

It is another object of our invention to provide a two-terminal, bipolar, self-powered current limiting circuit which is capable of withstanding relatively large voltages of either polarity.

At low current levels, a lead should offer little resistance. But it is also important that the resistance be relatively independent of semiconductor characteristics (if semiconductor devices are used in the limiting circuit). If this is not the case, in order to provide interchangeable leads it would be necessary to provide all leads with matched semiconductor devices.

It is still another object of our invention to provide a two-terminal, bipolar, self-powered current limiting circuit whose resistance to small currents is minimally dependent on the characteristics of semiconductor elements.

Depletion mode metal oxide semiconductor field-effect transistors (MOSFET'S and junction field-effect transistors have been proposed for use as current limiters, and more particularly in two-terminal configurations. If the gate and source electrodes are connected together, the field-effect transistor exhibits a relatively low resistance between its drain and source terminals until a certain current ($I_{DSS}$) is reached. At that point, the impedance rises very rapidly and the device operates as a current limiter. The field-effect transistor in this configuration is self-powered in that no biasing currents are required. It would be possible to insert such a field-effect transistor in series with any biomedical lead in which the current is to be limited. However, there are a number of problems with this approach. First and foremost, the device is not bipolar —it limits the current in only one direction. Second, it is very difficult to design field-effect transistor current limiters with low resistances to small currents which are relatively independent of transistor characteristics, and at the same time have high breakdown voltage values.

In the first embodiment of our invention, two field-effect transistors are connected in series. (Although the invention is described with reference to field-effect transistors, it is to be understood that any three-terminal device exhibiting similar characteristics could be employed, the distinguishing characteristic of all such devices being that the control or gate terminal serves almost exclusively to control the current flow through the other two terminals and does not itself draw any appreciable current.) The two source terminals are connected to each other, typically through a resistor. Each gate terminal is connected to the source terminal of the other field-effect transistor (again, typically through a resistor). The resulting circuit exhibits relatively low resistance between the two drain terminals; current of either polarity through the device increases linearly with the voltage appearing across it. When the voltage reaches a certain limiting value, however, the current levels off and remains essentially constant as the voltage increases.

This basic circuit, in a typical arrangement, has a breakdown voltage of approximately 50 volts of both polarities. To increase the breakdown voltage in either direction, and in order to make the current less dependent on voltage once a limiting value is exceeded, an additional field-effect transistor is placed in series with each of the first two transistors. The two gate terminals at either end of the circuit are connected to each other. The two additional field-effect transistors serve to increase the breakdown voltage in either direction and to make the current less dependent on voltage after the element enters the current limiting mode.

In another embodiment of the invention, three field-effect transistors are used at either end of the circuit, together with the resistive coupling between them described above. One transistor in each group of three serves to increase the breakdown voltage in a respective direction. The other two field-effect transistors in either group of three are arranged in a unique configuration to provide a bistable element. The major advantage of this configuration is that at high voltages the current is not maintained at the initial limiting value but is reduced to an almost insignificant level.

It is a feature of our invention to provide a symmetrical connection of field-effect transistors in a two-terminal configuration.

It is another feature of our invention to provide additional field-effect transistors in series with each terminal of the overall circuit for the purpose of increasing the breakdown voltage of the circuit in both directions.

It is a still further feature of our invention to provide two pairs of field-effect transistors arranged in a bistable configuration for dramatically limiting the current through the overall circuit when the voltage across the circuit exceeds a relatively small value.

Further objects, features and advantages of our invention will become apparent upon consideration of the following detailed description in conjunction with the drawing, in which:

FIG. 4A is a second illustrative embodiment of our invention;

FIG. 4B is the current-voltage characteristic for the circuit of FIG. 4A;

FIGS. 5, 6 and 7 are circuits which will be helpful in understanding the embodiment of the invention depicted in FIG. 9;

FIG. 8 depicts the current-voltage characteristics for the circuits of FIGS. 5 and 6;

FIG. 9 is a third illustrative embodiment of our invention; and

FIG. 10 depicts curves which will be helpful in understanding an advantage of the circuit of FIG. 9.

Figure 1:
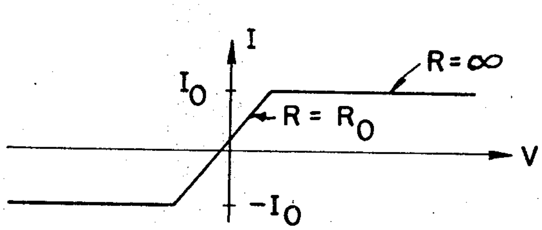
FIG. 1 depicts the ideal characteristics of a current limiting device suitable for use with biomedical electronic leads.

FIG. 1 depicts an ideal current-voltage characteristic for a two-terminal current limiting device. As the voltage across the two terminals starts to increase, the device exhibits a resistance R of value $R_O$. When the voltage has increased to the point such that a current $I_0$ flows, the current is thereafter maintained at this value independent of increases in voltage. The effective incremental resistance of the device is infinite. Similarly, for voltages of the opposite polarity the current is controlled in a similar manner. Ideally, resistance $R_0$ should be small compared to the input impedance of the instrument connected to the patient through a lead provided with the current limiting circuit in order that a large part of the signal at the patient electrode be applied to the input of the instrument.

Figure 2A:
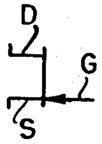
FIG. 2A is the symbol used to depict an n-channel field-effect transistor.
Figure 2B:
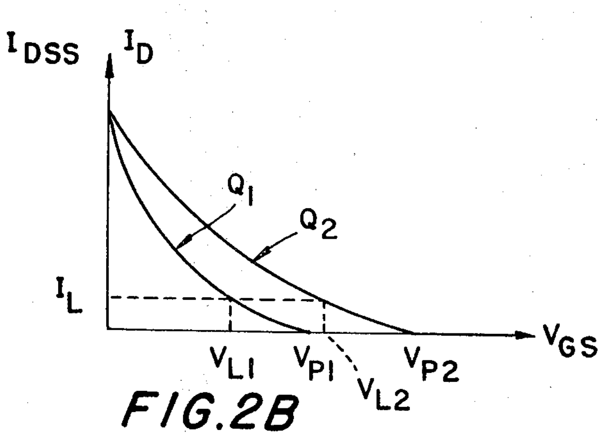
FIGS. 2B and 2C depict illustrative characteristics of field-effect transistors of the type depicted in FIG. 2A.

FIG. 2A shows the symbol for an n-channel field-effect transistor having drain D, gate G and source S terminals. The current-voltage characteristics for two field-effect transistors $Q_1$ and $Q_2$ are shown in FIG. 2B. The vertical axis represents the current through the drain (which equals the current through the source since the gate draws no appreciable current). The horizontal axis represents the reverse voltage bias of the gate and source. The field-effect transistor of FIG. 2A is of the n-channel type. Field-effect transistors of the P-channel type have characteristics similar to those of FIG. 2B except that the polarities are reversed.

Most field-effect transistors are square-law devices. The drain current ($I_D$) is related to the gate-source reverse bias ($V_{GS}$) by an equation of the form $I_D = T_{DSS}(1 - V_{GS}/V_P)^2$, where $I_{DSS}$ is the current for a gate-source voltage of zero and $V_p$ is the pinch-off voltage. The pinch-off voltage is that for which the drain current falls to a finite but very small specified value, and $I_{DSS}$ is the saturation current.

Figure 2C:
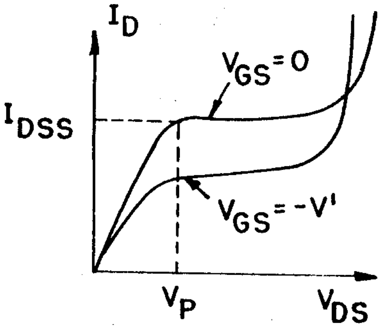

FIG. 2B shows the $I_D - V_{GS}$ characteristics for two transistors $Q_1$ and $Q_2$. Each characteristic (as well as the equation above which describes it), however, assumes a constant drain-source voltage ($V_{DS}$). $I_D$ actually varies with $V_{DS}$. This can be shown by curves drawn for constant values of $V_{GS}$. The two curves of FIG. 2C are for the same transistor. With $V_{GS}=0$, $I_D$ rises approximately linearly until $V_{GS}=V_p$, the pinch-off voltage. The current then remains fairly constant as $V_{DS}$ increases. If $V_{DS}$ increases beyond the breakdown value, however, the current starts to increase rapidly. For a negative $V_{GS}$ bias of $-V'$ volts, the $I_D - V_{DS}$ curve is lowered and the current bends occur at lower values of $V_{DS}$.

Figure 2D:
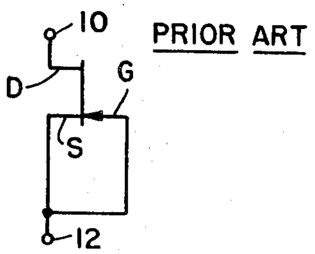
FIG. 2D depicts a well-known field-effect transistor configuration for providing a two-terminal, self-powered, unipolar current limiting device.

In FIG. 2D, a field-effect transistor is connected such that it acts as a two-terminal device with its source and gate connected together ($V_{GS}=0$). Referring back to FIG. 2C, in such a case when the voltage between terminals 10, 12 ($V_{DS}$) exceeds the value $V_p$, the current through the terminals is limited to $I_{DSS}$. For values of $V_{DS}$ below $V_p$, the current rises approximately linearly with the voltage. The configuration of FIG. 2D thus produces a current-voltage characteristic which is similar to the ideal characteristic of FIG. 1, namely, the $V_{GS}=0$ curve of FIG. 2C.

However, the simple circuit of FIG. 2D suffers from three serious disadvantages if it is attempted to use it for limiting the current through a lead connected to a biomedical electronic instrument. First, the device is not bipolar —current limiting occurs only through the device from input terminal 10 to output terminal 12; in the other direction the device functions as a diode. Second, the value of $I_{DSS}$ is generally greater than the maximum desirable value in many applications unless very expensive field-effect transistors are used. Third, the device exhibits a breakdown voltage which is relatively low in transistors having a low value of $I_{DSS}$. If the voltage across terminals 10, 12 exceeds this value, the field-effect transistor conducts heavily.

Figures 2E, 3B:
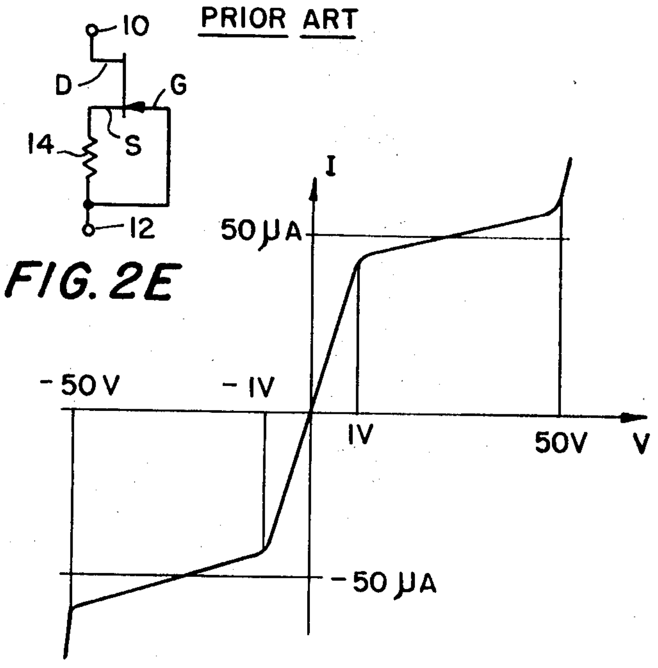
FIG. 2E is similar to the circuit of FIG. 2D but includes an additional resistor for reducing the maximum current through the device.
FIG. 3B is the current-voltage characteristic for the circuit of FIG. 3A.

The configuration of FIG. 2E is similar to that of FIG. 2D, except for the addition of resistor 14. This resistor has sometimes been provided in the prior art to solve the second problem, namely, to lower the limit of the maximum current. In effect, current through the device causes a voltage to be developed across resistor 14 which biases the gate negatively with respect to the source. Consequently, $V_{GS}$ is not 0 as in the case of FIG. 2D, and as is evident from the curves of FIG. 2C the limiting current is smaller than $I_{DSS}$. Reduction in current, however, is achieved at the expense of an increased resistance (equivalent to $R_0$ in FIG. 1) between terminals 10, 12. The effective value of $R_0$ is the sum of the resistance of resistor 14 and the "on" resistance of the transistor between the drain and source, $R_{DSS}$.

Figure 3A:
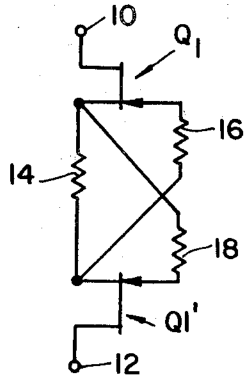
FIG. 3A depicts a first illustrative embodiment of our invention.

The embodiment of the invention shown in FIG. 3A includes two n-channel field-effect transistors Q1, Q1′ connected in series between terminals 10, 12. The two source terminals are connected to each other through resistor 14. The source of Q1′ is connected through resistor 16 to the gate of Q1, and the source of Q1 is connected through resistor 18 to the gate of Q1′. The device is bipolar as shown in FIG. 3B, the current-voltage characteristic for the overall unit between terminals 10, 12. As the voltage increases in either direction from zero to a magnitude in the order of typically 1 volt, the current increases linearly. Thereafter, the current is approximately constant. When the voltage exceeds approximately 50 volts, however, the device breaks down and a large current flows.

The circuit can be understood by first considering the case in which terminal 10 is positive with respect to terminal 12 by less than 1 volt. Resistor 16 serves no purpose at this time since the gate of Q1 draws no current. The resistor just serves to connect the gate terminal to the lower end of resistor 14, in effect producing a configuration such as that shown in FIG. 2E. Resistor 18 couples the upper terminal of resistor 14 to the gate of Q1′. Since there is a voltage drop across resistor 14, the gate of Q1′ is positive with respect to its source. With such a forward bias, transistor Q1′ functions as a diode between source and gate. Without resistor 18, the voltage across resistor 14 would be limited to the essentially fixed forward bias voltage between the gate and source terminals of transistor Q1′. If the reverse voltage across the gate and source of transistor Q1 which is required to limit the current through Q1 is more than the forward bias across the gate and source terminals of transistor Q1′transistor Q1 would not limit the current to the low value desired. To obtain a reverse bias across the gate and source terminals of transistor Q1 which exceeds the forward bias of transistor Q1′resistor 18 (much larger than resistor 14) is provided to enable the drop across resistor 14 to rise to a value in excess of the forward bias of transistor Q1′. If the value of $V_{GS}$which limits the current through transistor Q1 to the desired value is less in magnitude than the forward bias of transistor Q1′, resistor 18 can be omitted and the gate of transistor Q1′can be connected directly to the source of transistor Q1.

Similarly, if terminal 12 is positive with respect to terminal 10, field-effect transistor Q1 functions as a diode from gate to source. Resistor 18 now serves no function, and resistor 16 serves to prevent the voltage across resistor 14 from being limited to the gate-source forward bias of transistor Q1. Resistor 14 serves to lower the maximum current through the device, just as it does when the current flows in the opposite direction.

Referring to the characteristic of FIG. 3B, the current-voltage curve in the first quadrant is determined for the most part by transistor Q1, transistor Q1′ simply functioning as a resistor. The curve in the third quadrant is determined for the most part by transistor Q1′, transistor Q1 simply functioning as a resistor. In the circuit of FIG. 3A, both transistors are type Nos. 2N4302, resistor 14 has a value of 10k. and resistors 16, 18 each have a value of 100k. The voltage at which current limiting begins in either direction is 1 volt (see FIG. 3B), and the current is limited to approximately 50 microamperes when the voltage is between 1 and 50 volts. For voltages less than 1 volt, the circuit exhibits a resistance between terminals 10, 12 which is the sum of the resistance of resistor 14 and the $R_{DSS}$-parameters of the two transistors.

The circuit of FIG. 3A has a breakdown voltage of 50 volts in either direction. This is too low for many applications. However, high breakdown transistors are not generally available which satisfy the other requirements of the circuit. These other requirements are a low value of effective $R_0$, and circuit operation which is minimally dependent on individual transistor characteristics.

For minimum dependence on the circuit characteristics, $R_{DSS}$should be low (compared to the resistance of resistor 14). A low value of $R_{DSS}$is equivalent to a high value of $V_P$. Referring to FIG. 2B, assume that the current is to be limited to a value of $I_L$. For transistor $Q_1$this requires a gate-source voltage of $V_{L1}$volts, and for transistor $Q_2$this requires a gate-source voltage of $V_{L2}$volts. To develop both of these voltages from a current of $I_L$, it is apparent that transistor $Q_2$requires a larger resistor 14. Thus the use of a transistor with a larger value of $V_p$(in order to obtain a lower value of $R_{DSS}$requires a larger resistor 14 which may cause the effective $R_0$to be too high.

In the practical design of circuits such as that of FIG. 3A, resistance values and transistors are selected which offer the best compromise between the conflicting criteria. In almost all cases it is found that the transistors which are the most suitable have relatively low breakdown voltages.

The breakdown voltage can be increased by utilizing the embodiment of the invention shown in FIG. 4A. The circuit is similar to that shown in FIG. 3A except for the addition of one of field-effect transistors Q2, Q2′ at each input. The source of transistor Q2 is connected to the drain of transistor Q1, and the two gates are connected to each other. Similar remarks apply to transistors Q1′Q2′. Each pair of transistors such as Q1, Q2 is arranged in a cascode configuration. Effectively, transistor Q1 is equivalent to the source resistance 14 in FIG. 2E for transistor Q2. When the limiting current is reached, as determined by one of transistors Q1 and Q1′the resistance between the source and drain of Q1 or Q1′increases significantly since the current through the transistor levels off. There is thus a very high resistance interconnecting the source and gate of transistor Q2 or Q2′ and this tends to flatten out the characteristic for voltages in excess of 1 volt, as shown in FIG. 4B. More significantly, the additional transistors increase the breakdown voltage in either direction from 50 volts to 200 volts. The design requirements for transistors Q2, Q2′ are different from those for transistors Q1, Q1′. Transistors Q1, Q1′ are selected to optimize $R_0$and $V_p$without too much concern for a high breakdown voltage. Transistor Q1 has a lower pinch-off voltage than transistor Q2. (Similar remarks apply to transistors Q1′ and Q2′.). Referring to FIG. 2B, it is apparent that transistor Q1 limits first as the voltage increases. Since the voltage across transistor Q1 cannot exceed the pinch-off voltage of transistor Q2 as a result of the transistor connections, to prevent the breakdown of transistor Q1 it is only necessary to choose transistor Q2 to have a pinch-off voltage smaller than the breakdown voltage of transistor Q1. Transistor Q2 is selected to have a large breakdown voltage. It is also desirable to select this transistor such that its $R_{DSS}$parameter is as low as possible since the effective $R_0$for the circuit of FIG. 4A is the sum of the resistance of resistor 14 and the four $R_{DSS}$parameters of the four transistors.

It should be noted that the characteristic of FIG. 4B in the limiting mode is flatter than that of FIG. 3B. It should further be noted, however, that above the knee the maximum current flows through the device. It is sometimes desirable to drastically limit the current when the input voltage is above 1volt (or whatever other voltage c causes the device to enter its current limiting mode of operation).

The circuit of FIG. 5 includes an n-channel field-effect transistor Q6, together with a P-channel field-effect transistor Q5. The source and gate of transistor Q5 are connected together to produce a two-terminal device, the two terminals being placed between the source of transistor Q6 and terminal 12. Thus the circuit of FIG. 5 is very similar to that of FIG. 2E except that resistor 14 has been replaced by transistor Q5. If transistor Q5 has the larger limiting current, the value of the limiting current is determined by the characteristic of transistor Q6; transistor Q5 simply operates as a linear device and its source-to-drain resistance in effect replaces resistor 14 of FIG. 2E.

This understanding of the circuit of FIG. 5 leads to an understanding of the circuit of FIG. 6. Here, the gate of transistor Q5 is returned to the drain of transistor Q6, rather than to the source of this transistor. With a small voltage across terminals 10, 12, transistor Q5, having a larger limiting current than transistor Q6, still functions as a resistor even when transistor Q6 starts to cut off. However, as the voltage drop across terminals 10, 12 increases, transistor Q5 becomes biased towards cut off. As this happens, the effective impedance of transistor Q5 increases, causing the current in transistor Q6 to decrease. Both transistors are now operating above $V_p$. As the voltage between terminals 10, 12 is increased, the reverse bias of both gates is increased causing the current to drop to a very low residual leakage value.

The circuit of FIG. 6 is a bistable device whose characteristics are shown in FIG. 8. Initially it is assumed that there is no voltage drop across terminals 10, 12. As terminal 10 starts to go positive with respect to terminal 12, transistor Q5 in FIG. 6 functions just as does transistor Q5 in FIG. 5 —it presents a relatively small resistance connected to the source of transistor Q6. As shown by the portion of the characteristic identified by the numeral 20 in FIG. 8 ,the current flowing through the circuit of either FIG. 5 or FIG. 6 starts to increase with the voltage up to a limiting value of 50 microamperes. The limiting current is reached when the voltage across terminals 10, 12 is about 1 volta. In the circuit of FIG. 5, when the voltage exceeds 1 volt the current through the circuit remains at the 50 -microampere level, as shown by that portion of the characteristic identified by the numeral 22. With the circuit of FIG. 6, however, when the voltage rises above the 1 -volt level, the current does not remain at the 50 -microampere level. Instead, as shown by that portion of the characteristic identified by the numeral 24, the current starts to fall and eventually reaching the leakage current level of less than 1 microampere. Thus, the circuit of FIG. 6 is advantageous in that for large values of voltage the current does not remain at the current limiting value but instead actually decreases to less than 1 microampere. If the voltage then starts to decrease, the current does not follow original curve 24 in the reverse direction. Instead, it follows that portion of the characteristic identified by numeral 26. Once the device is in its low-conduction state, it cannot be placed in its high-conduction state until the voltage across terminals 10, 12 is reduced to a very low value.

The circuit of FIG. 7 does not exhibit a symmetrical characteristic for opposite polarity voltages across terminals 10, 12. Two circuits of the type shown in FIG. 7 can be connected in the configuration of FIG. 9 to produce a bipolar circuit. Resistor 34 in FIG. 9 is equivalent to resistor 14 in FIG. 4A, and resistors 30, 32 are equivalent to resistors 16, 18. If transistors Q6, Q6′ have low pinch-off voltages, resistors 30, 32 can be omitted. Because of the series "on" resistance of transistors Q5, Q5′it is not necessary to provide resistor 34. This resistor simply serves to lower the upper limit of the current which can flow between terminals 10, 12 in FIG. 9, at the expense of increased resistance between the two terminals during low-current operation of the circuit, and also stabilize the circuit parameters with respect to transistor variations.

In a preferred embodiment of the invention, transistors Q5, Q5′ in FIG. 9 are type No. 1N2843, transistors Q6, Q6′ are type No. N3687 and transistors Q7, Q7′ are type No. TIXS 78. If resistor 34 is replaced by a short circuit, the effective resistance between terminals 10, 12 during linear operation of the device is approximately 8 kilohms, and the limiting current is approximately 100 microamperes. (After this current is reached, if the voltage across terminals 10, 12 is increased the current drops to the leakage value.) If resistor 34 has a value of 7 kilohms, the effective resistance between terminals 10, 12 during linear operation is approximately 15 kilohms, and the limiting value of current is approximately 50 microamperes. If resistor 34 has a value of 12 kilohms, the effective resistance between terminals 10, 12 during the linear portion of the characteristic is approximately 20 kilohms, and the limiting current is approximately 30 microamperes.

An advantage of the circuit of FIG. 9 will become apparent with reference to FIG. 10. Curve 51, essentially a straight line, shows the leakage current through a typical two-terminal current limiter. Although leakage currents have not been considered above, it is to be understood that they are present in any current limiter and increase with increasing voltage. Curve 50 depicts the current through the current limiter as a result of the applied forward voltage. The sum of the currents, depicted by dotted curve 52, is approximately equal to the leakage current at high voltages. If curve 50 did not drop off above 1 volt, then at high voltages the total current would be larger by the value of the limiting current (50 microamperes as shown on FIG. 8).

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

What is claimed is:

1. A two-terminal, bipolar, self-powered current limiting device comprising first and second field-effect transistors, each having drain, source and gate terminals, input and output terminals, each of said drain terminals being coupled to a respective one of said input and output terminals, impedance means connected between the source terminals of said two transistors, and means for coupling the gate terminal of each of said transistors to the source terminal of the other of said transistors.

2. A two-terminal, bipolar, self-powered current limiting device in accordance with claim 1 wherein an impedance is included in each of said coupling means.

3. A two-terminal, bipolar, self-powered current limiting device in accordance with claim 1 further including an additional pair of field-effect transistors, the drain of each of said first and second field-effect transistors being coupled to the source of a respective one of said additional field-effect transistors, the gate of each of said first and second field-effect transistors being connected directly to the gate of the respective one of said additional field-effect transistors, and the drain of each of said additional field-effect transistors being connected directly to a respective one of said input and output terminals.

4. A two-terminal, bipolar, self-powered current limiting device in accordance with claim 3 wherein each of said additional field-effect transistors has a higher pinch-off voltage than said first and second transistors.

5. A two-terminal, bipolar, self-powered current limiting device in accordance with claim 4 wherein an impedance is included in each of said coupling means.

6. A two-terminal, bipolar, self-powered current limiting device in accordance with claim 3 wherein an impedance is included in each of said coupling means.

7. A two-terminal, bipolar, bistable, self-powered current limiting device comprising a pair of input terminals and a pair of active circuits; each of said active circuits including first and second field-effect transistors of one type and a third field-effect transistor of the opposite type, the gates of said first and second transistors being connected to each other, the source of said second transistor and the source of said third transistor being connected together, the gate of said third transistor, the drain of said second transistor and the source of said first transistor being connected together, and the drain of said first transistor being connected to a respective one of said pair of input terminals; means for connecting the drains of the third transistors in said two active circuits; and means for connecting the interconnected gates of the first and second transistors in each of said active circuits to the drain of the third transistor in the other of said active circuits.

8. A two-terminal, bipolar, self-powered current limiting device in accordance with claim 7 wherein the first transistor in each of said active circuits has a higher pinch-off voltage than the second transistor in each of said active circuits.